United States Patent [19]

Küchler et al.

[11] 4,350,782

[45] Sep. 21, 1982

[54] AQUEOUS PLASTIC DISPERSION, A PROCESS FOR ITS PREPARATION, ITS USE AND A SHEET PREPARED FROM THE PLASTIC DISPERSION

[75] Inventors: Manfred Küchler, Oberursel; Günther Duve; Joachim Ebigt, both of Frankfurt am Main, all of Fed. Rep. of Germany

[73] Assignee: Hoechst Aktiengesellschaft, Frankfurt am Main, Fed. Rep. of Germany

[21] Appl. No.: 302,400

[22] Filed: Sep. 15, 1981

[30] Foreign Application Priority Data

Sep. 17, 1980 [DE] Fed. Rep. of Germany ........ 3034949

[51] Int. Cl.³ .............................................. C08L 31/04
[52] U.S. Cl. ...................... 523/334; 524/11; 524/35; 524/501; 524/524
[58] Field of Search .................... 523/334; 524/11, 35, 524/501, 524

[56] References Cited

U.S. PATENT DOCUMENTS 3,901,843 8/1975 Fechillas ............................ 524/501

OTHER PUBLICATIONS

*Kolloid Zeitschrift,* vol. 148, pp. 57–66, 1956.
*German Plastics Digest,* vol. 50, No. 11, pp. 606–612, 1960.

*Primary Examiner*—Maurice J. Welsh
*Attorney, Agent, or Firm*—Curtis, Morris & Safford

[57] ABSTRACT

An aqueous plastic dispersion which is based on three vinyl polymers differing in type and properties, and which additionally contains a filler, is prepared by mixing a mixture of aqueous dispersions of the polymers in question with an aqueous suspension of the filler. The most important distinguishing characteristic of the polymers mentioned is their glass transition temperature. A fibrous material is employed as the filler. The plastic dispersion is suitable as a starting material for the preparation of sheets with vibration-damping properties.

7 Claims, No Drawings

AQUEOUS PLASTIC DISPERSION, A PROCESS FOR ITS PREPARATION, ITS USE AND A SHEET PREPARED FROM THE PLASTIC DISPERSION

The invention relates to an aqueous plastic dispersion which contains three different polymers and a fibrous filler, and to a process for its preparation, its use as a starting material for vibration-damping sheets and a sheet composed of the plastic dispersion.

It is known that copolymers as well as polymer mixtures are suitable for the preparation of vibration-damping sheets; in particular, mixtures of polystyrene and polymethyl methacrylate, of polystyrene and a styrene/methyl acrylate copolymer and of polymethyl methacrylate and polyvinyl acetate have been investigated (see Kolloid-Zeitschrift (Colloid Journal), volume 148 (1956), pages 57 et seq.).

It is further known that fillers affect the sound-damping action of anti-drumming compositions which contain, as the binding agent, an acrylate copolymer, a polyvinyl propionate or a polyvinyl acetate which contains a plasticizer, fillers such as vermiculite, mica, graphite, kaolin, china clay, feldspar, talc, asbestos, carbon black, barium sulfate and perlites are each employed in these compositions in a quantity of up to 40 percent (see Kunststoffe (Plastics), volume 50 (1960), pages 606 et seq.).

An important criterion for the applicability of vibration-damping materials for damping bending vibrations of hard plates, in particular of metal sheets in sheet metal constructions of vehicles of all types, and in machines, equipment and components, is the temperature range of the damping, which is principally of interest for the frequency range between 100 and 1,000 hertz for most of the industrial uses of damping materials (see Kolloid-Zeitschrift (Colloid Journal), volume 216 to 217 (1967), pages 64 et seq.).

The object of the invention is the provision of an aqueous plastic dispersion which contains a filler and is suitable for the preparation of sheets with vibration-damping properties.

The invention now relates to an aqueous plastic dispersion based on several different vinyl polymers, wherein the total quantity of the vinyl polymers comprises (a) 4 to 54 percent by weight of a copolymer of a vinyl ester of a monocarboxylic acid and an alkyl acrylate with a glass transition temperature of at most $-10°$ C., (b) 4 to 54 percent by weight of a copolymer of a vinyl ester of a monocarboxylic acid and an acrylate with a glass transition temperature of 0° to 20° C., and (c) 2 to 52 percent by weight of a homopolymer of a vinyl ester of a monocarboxylic acid with a glass transition temperature greater than 20° C., and the plastic dispersion contains 10 to 80 percent by weight of a fibrous material (d), the quantity of component (d) being relative to the total amount of the polymers (a), (b) and (c).

The invention also relates to a process for the preparation of an aqueous plastic dispersion based on several different vinyl polymers, wherein a mixture composed of (a) 10 to 85 parts by weight of an aqueous dispersion of a copolymer of a vinyl ester of a monocarboxylic acid and an acrylate with a glass transition temperature of at most $-10°$ C., (b) 10 to 85 parts by weight of an aqueous dispersion of a copolymer of a vinyl ester of a monocarboxylic acid and an acrylate with a glass transition temperature of 0° to 20° C. and (c) 5 to 80 parts by weight of an aqueous dispersion of a homopolymer of a vinyl ester of a monocarboxylic acid with a glass transition temperature greater than 20° C., the sum of the parts by weight a+b+c being 100 parts by weight, is uniformly mixed, at a temperature of 10 to 30° C., into (d) 10 to 400 parts by weight of an aqueous suspension of a fibrous material.

The invention furthermore relates to the use of the previously mentioned aqueous plastic dispersion, which contains a filler, as a starting material for the preparation of vibration-damping sheets, and the sheets prepared from the plastic dispersion.

The plastic dispersion according to the invention is preferably composed of 30 to 80 percent by weight of an aqueous dispersion of polymer (a), 10 to 35 percent by weight of an aqueous dispersion of polymer (b), 10 to 35 percent by weight of an aqueous dispersion of polymer (c) and 10 to 80 percent by weight of an aqueous suspension of the filler (d), the quantity of the suspension of (d) being relative to the sum of the dispersions of (a), (b) and (c).

An essential constituent of the plastic dispersion according to the invention is a mixture composed of three polymers differing in type and properties. Polymer (a) of the polymer mixture present in the dispersion is a copolymer of a vinyl ester of a monocarboxylic acid and an alkyl acrylate, which has a glass transition temperature of at most $-10°$ C., preferably of $-50°$ to $-10°$ C. Polymer (b) is a copolymer of a vinyl ester of a monocarboxylic acid and an acrylate, which has a glass transition temperature of 0° to 20° C., preferably 5° to 18° C. Finally, polymer (c) is a homopolymer of a vinyl ester of a monocarboxylic acid with a glass transition temperature greater than 20° C., preferably of 21° to 50° C. A mixture of the polymers (a), (b) and (c) in which the glass transition temperature of the polymer (b) differs by at least 20° C. in each case from those of the polymers (a) and (c) is particularly advantageous.

The polymer (a) is, in particular, a copolymer of 20 to 45, preferably 30 to 40, percent by weight of a vinyl ester of a monocarboxylic acid having 2, 3 or 4 carbon atoms and 80 to 55, preferably 70 to 60, percent by weight of an alkyl acrylate with a higher alkyl radical, which has 6 to 10, preferably 8, carbon atoms. Vinyl acetate as well as vinyl propionate and vinyl butyrate are preferred suitable vinyl esters. 2,2-dimethylbutyl acrylate, 3,3-dimethylbutyl acrylate and, in particular, 2-ethylhexyl acrylate are examples of suitable alkyl acrylates with a higher alkyl radical. For the preparation of the plastic dispersion according to the invention, polymer (a) is employed in the form of an aqueous dispersion which has a solids content of 35 to 60, preferably to 40 to 55, percent by weight and the viscosity of which is in the range from 0.2 to 5, preferably 0.5 to 3, Pa.s (measured in an Epprecht rheometer STV at a temperature of 23° C. according to DIN 53,788).

The polymer (b) is, in particular, a copolymer of 55 to 85, preferably 60 to 80, percent by weight of a vinyl ester of a monocarboxylic acid having 2, 3 or 4 carbon atoms and 45 to 15, preferably 40 to 20, percent by weight of an alkyl acrylate with a lower alkyl radical which has 1 to 4 carbon atoms. Vinyl acetate as well as vinyl propionate and vinyl butyrate are preferred suitable vinyl esters. Methyl acrylate, ethyl acrylate, propyl acrylate and butyl acrylate are examples of suitable acrylates with a lower alkyl radical. For the preparation of the plastic dispersion according to the invention, polymer (b) is employed in the form of an aqueous dispersion which has a solids content of 35 to 60, preferably of 40 to 55, percent by weight and the viscosity of which is in the range from 0.1 to 3, preferably 0.2 to 1.5, Pa.s (measured in an Epprecht rheometer at a temperature of 23° C. according to DIN 53,788).

The polymer (c) is, in particular, a homopolymer of a vinyl ester of a monocarboxylic acid having 2, 3 or 4 carbon atoms, in particular preferably polyvinyl acetate as well as polyvinyl propionate and polyvinyl butyrate. For the preparation of the plastic dispersion according to the invention, polymer (c) is employed in the form of an aqueous dispersion which has a solids content of 35 to 60, preferably 40 to 55, percent by weight and the viscosity of which is in the range from 10 to 40, preferably 20 to 34, Pa.s (measured in an Epprecht rheometer at a temperature of 23° C. according to DIN 53,788).

The component (d) of the plastic dispersion according to the invention is a fibrous material which serves as a filler. The fibrous material is, in general, an organic material and of natural origin, or synthetic. Glass fibers, carbon fibers, cellulose fibers, plastic fibers, such as polyester fibers, polyamide fibers or polyacrylonitrile fibers, and particularly leather fibers are suitable materials. The leather fibers are customarily obtained by the comminution of wastes from bark-tanned or chrome-tanned leather; the latter is particularly suitable within the scope of the invention. Instead of a single fiber material, mixtures of different materials can also be employed. The fiber material is employed in the form of an aqueous suspension for the preparation of the plastic dispersion according to the invention. The solids content of this suspension is normally in the range from 3 to 10, preferably from 4 to 8, percent by weight.

The plastic dispersion according to the invention is prepared by uniform and intensive mixing of aqueous dispersions of polymers (a), (b) and (c) and an aqueous suspension of the fibrous filler (d) at a temperature from 10° to 30° C., preferably at room temperature. A period of from 5 to 10 minutes is normally sufficient for the preparation of the mixture. Any vessel which can be provided with a mixing implement, for example a stirrer, is suitable as the mixing vessel. It is advisable firstly to introduce the suspension of the fiber material into the mixing vessel and then to mix the mixture of the polymer dispersions into the suspension. In this process, it may be advantageous to adjust the dispersion mixture as well as the filler suspension to a low solids content by dilution with water before mixing.

The plastic dispersion according to the invention is used for the preparation of sheets with vibration-damping properties. For this purpose, a water-soluble coagulant is added to the plastic dispersion, whilst the mixture is continuously thoroughly mixed, preferably by stirring. An electrolyte, for example a weak organic acid, such as formic acid or acetic acid, or preferably a neutral or weak acid salt, such as calcium chloride, sodium sulfate, aluminum sulfate or alum, is used as the coagulant. The coagulant is preferably employed in dilute aqueous solution, the coagulant content of which is in the range from 5 to 20, preferably 8 to 15, percent by weight. The quantity of coagulant is 2 to 20, preferably 5 to 10, percent by weight (relative to the dispersion). For completion of the coagulation of the polymers, the mixture is adjusted to a pH value of from 7 to 9, preferably 7.1 to 8.5, if appropriate by the addition of an aqueous solution of an inorganic base, for example ammonia solution, sodium hydroxide solution or potassium hydroxide solution. The end point of the coagulation can be detected in that a sample of the coagulation mixture gives a clear filtrate when filtered. After the end of the coagulation, the mixture obtained is filtered over a flat filter, preferably using reduced pressure, for example under a pressure of from $10^{-4}$ to 15 mbars. If appropriate, water is further removed from the sheet-like filter cake thereafter obtained under a pressure of preferably 20 to 30 bars, with the aid of a press. The resulting sheet is then dried, preferably at a temperature of from 20° to 40° C.

The sheet according to the invention has a thickness of from 1 to 5, preferably 1.5 to 4, mm. The sheet has a vibration-damping action, particularly at frequencies of 100 and 1,000 hertz, in the temperature range of at most −20° C. to at least +40° C.

The damping behavior of the sheet according to the invention is tested by determining the loss factor in the bending vibration test according to DIN 53,440. The test piece used in this test consists of a steel sheet and the sheet to be tested, which is attached to the steel sheet, preferably by adhesive bonding. The sheet has a thickness of from 1.5 to 2.5 mm, whilst the steel sheet is 1.0 mm thick; in this case, the coating factor, that is to say, the quotient, multiplied by 100, of the sheet mass and the metal sheet mass, is 40 to 60 percent, preferably at most 50 percent. The measurement is carried out in each case at a frequency of 100 hertz and 1,000 hertz. The damping behavior is to be evaluated as good if the temperature range, at a loss factor of at least 0.05, extends over a range of at least 60° C., the lower limit of the temperature being at most −20° C.

The examples below serve to illustrate the invention in more detail. Percentage data and ratio data each relate to weight.

EXAMPLE 1

1,000 g of an aqueous suspension containing 4% of chrome-tanned leather fibers are initially introduced into a 5 l plastic container into which a blade stirrer dips, and the suspension is diluted with 1,600 g of water to a solids content of 1.5%, whilst stirring continuously. 1,000 g of a dispersion mixture are metered, during the course of 5 minutes, into this dilute suspension, whilst stirring. This dispersion mixture was prepared from (a) 200 g of an aqueous dispersion of a copolymer of vinyl acetate and 2-ethylhexyl acrylate (monomer ratio 35:65; glass transition temperature −32° C.) with a solids content of 50%, (b) 100 g of an aqueous dispersion of a copolymer of vinyl acetate and butyl acrylate (monomer ratio 70:30; glass transition temperature 2° C.) with a solids content of 53% and (c) 100 g of an aqueous dispersion of a vinyl acetate homopolymer (glass transition temperature 29° C.) with a solids content of 60%, as well as 3,600 g of water as a diluent. The dispersion mixture is mixed with the filler suspension at a temperature of 23° C.

EXAMPLE 2

45 ml of a 10% strength aqueous aluminum sulfate solution are added during the course of 10 minutes to 800 g of the plastic dispersion obtained according to Example 1 and containing a filler, and the mixture is thereafter adjusted to a pH value of 8 by the addition of 10% strength sodium hydroxide solution. After the end of the coagulation, the mixture is filtered under suction, under a pressure of 12 mbars (water jet pump), through a porcelain suction filter with a filter surface of 531 cm$^2$. The filter cake is then dried overnight at a temperature of 25° C. The sheet obtained has a thickness of 1.5 mm.

The damping behavior of the sheet is investigated in the bending vibration test according to DIN 53,440. The test piece consists of a steel sheet which has a thickness of 0.5 mm and is attached to the sheet by adhesive bonding. The test yields a loss factor of at least 0.05, at a coating factor of 34.6%, over a temperature range of −25° C. to +35° C. at a frequency of 100 Hz, and of −20° C. to +40° C. at a frequency of 1,000 Hz.

We claim:

1. An aqueous plastic dispersion based on several different vinyl polymers, which contains (a) 4 to 54 percent by weight of a copolymer of a vinyl ester of a monocarboxylic acid and an alkyl acrylate with a glass transition temperature of at most −10° C., (b) 4 to 54 percent by weight of a copolymer of a vinyl ester of a monocarboxylic acid and an acrylate with a glass transition temperature of from 0° to 20° C., (c) 2 to 52 percent by weight of a homopolymer of a vinyl ester of a monocarboxylic acid with a glass transition temperature greater than 20° C. and (d) 10 to 80 percent by weight of a fibrous material, the quantity of the component (d) being relative to the sum of the polymers (a), (b) and (c).

2. A plastic dispersion as claimed in claim 1, wherein component (a) is a copolymer of 20 to 45 percent by weight of a vinyl ester of a monocarboxylic acid having 2, 3 or 4 carbon atoms and 80 to 55 percent by weight of an alkyl acrylate having a higher alkyl radical which contains 6 to 10 carbon atoms, component (b) is a copolymer of 55 to 85 percent by weight of a vinyl ester of a monocarboxylic acid having 2, 3 or 4 carbon atoms and 45 to 15 percent by weight of an alkyl acrylate having a lower alkyl radical which contains 1 to 4 carbon atoms, and component (c) is a homopolymer of a vinyl ester of a monocarboxylic acid having 2, 3 or 4 carbon atoms.

3. A plastic dispersion as claimed in claim 1, wherein component (a) has a glass transition temperature of from −50° to −10° C. and component (c) has a glass transition temperature of from 21° to 50° C.

4. A plastic dispersion as claimed in claim 1, wherein component (d) consists of leather fibers.

5. A process for the preparation of an aqueous plastic dispersion based on several different vinyl polymers, wherein a mixture composed of (a) 10 to 85 parts by weight of an aqueous dispersion of a copolymer of a vinyl ester of a monocarboxylic acid and an acrylate with a glass transition temperature of at most −10° C., (b) 10 to 85 parts by weight of an aqueous dispersion of a copolymer of a vinyl ester of a monocarboxylic acid and an acrylate with a glass transition temperature of 0° to 20° C. and (c) 5 to 80 parts by weight of an aqueous dispersion of a homopolymer of a vinyl ester of a monocarboxylic acid with a glass transition temperature greater than 20° C., the sum of the parts by weight a+b+c being 100 parts by weight, is uniformly mixed, at a temperature of 10° to 30° C., into (d) 10 to 400 parts by weight of an aqueous suspension of a fibrous material.

6. Use, as a starting material for the preparation of vibration-damping sheets, of the plastic dispersion as claimed in claim 1.

7. A vibration-damping sheet prepared from the plastic dispersion as claimed in claim 1.

* * * * *